US012658741B2

(12) United States Patent (10) Patent No.: US 12,658,741 B2
Gross (45) Date of Patent: Jun. 16, 2026

(54) MAGNETIC POSITIONING FOR INDUCTIVELY CHARGING A HAND-HELD, HAIR CLIPPER ON A CHARGING PAD

(71) Applicant: Andis Company, Sturtevant, WI (US)

(72) Inventor: Nicholas David Gross, Burlington, WI (US)

(73) Assignee: Andis Company, Sturtevant, WI (US)

( * ) Notice: Subject to any disclaimer, the term of this patent is extended or adjusted under 35 U.S.C. 154(b) by 802 days.

(21) Appl. No.: 18/047,770

(22) Filed: Oct. 19, 2022

(65) Prior Publication Data

US 2023/0112732 A1 Apr. 13, 2023

Related U.S. Application Data

(63) Continuation of application No. PCT/US2022/077793, filed on Oct. 7, 2022.

(60) Provisional application No. 63/253,922, filed on Oct. 8, 2021.

(51) Int. Cl.
*H02J 50/90* (2016.01)
*B26B 19/38* (2006.01)
*H02J 50/10* (2016.01)

(52) U.S. Cl.
CPC .......... *H02J 50/90* (2016.02); *B26B 19/3873* (2013.01); *H02J 50/10* (2016.02)

(58) Field of Classification Search
CPC .......... H02J 50/90; H02J 50/10; H02J 7/0044; H02J 50/005; A45D 27/29; B26B 19/06; B26B 19/3833; B26B 19/3873
See application file for complete search history.

(56) References Cited

U.S. PATENT DOCUMENTS

| | | | |
|---|---|---|---|
| 3,648,370 A | | 3/1972 | Cercone |
| 3,840,795 A | * | 10/1974 | Roszyk ................... H01F 38/14 |
| | | | 320/108 |
| 4,614,036 A | | 9/1986 | Haraguchi |
| 4,942,352 A | * | 7/1990 | Sano ....................... H02J 50/70 |
| | | | 320/164 |
| 5,600,225 A | | 2/1997 | Goto |
| 5,894,670 A | * | 4/1999 | Iso ...................... B26B 19/3833 |
| | | | 340/13.31 |

(Continued)

FOREIGN PATENT DOCUMENTS

| | | | | |
|---|---|---|---|---|
| CN | 202167887 U | * | 3/2012 | |
| CN | 106464166 A | * | 2/2017 | ............. H02J 50/90 |

(Continued)

OTHER PUBLICATIONS

International Search Report and Written Opinion for International Application No. PCT/US2022/077793, dated Jan. 20, 2023, 13 pages.

*Primary Examiner* — Jared Fureman
(74) *Attorney, Agent, or Firm* — Reinhart Boerner Van Deuren s.c.

(57) ABSTRACT

Various designs of a system for charging a hand-held, hair cutting device are shown. The system includes a hair cutting device and a charging station. The hair cutting device and charging station each include an inductive charging coil. At least one of the hair cutting device and charging station include a magnet to pull or bias the hair cutting device such that the respective inductive charging coils are brought into alignment, allowing for charging of the hair cutting device.

21 Claims, 12 Drawing Sheets

(56) References Cited

U.S. PATENT DOCUMENTS

| | | | | |
|---|---|---|---|---|
| 6,112,414 | A | 9/2000 | Andis et al. | |
| 7,952,322 | B2 | 5/2011 | Partovi et al. | |
| 8,169,185 | B2 * | 5/2012 | Partovi | H01F 27/366 |
| | | | | 320/108 |
| 8,373,388 | B2 | 2/2013 | Kim et al. | |
| 8,380,998 | B2 | 2/2013 | Azancot et al. | |
| 8,629,654 | B2 | 1/2014 | Partovi et al. | |
| 8,762,749 | B2 | 6/2014 | Azancot et al. | |
| 8,766,484 | B2 * | 7/2014 | Baarman | H01F 38/14 |
| | | | | 307/104 |
| 8,947,047 | B2 | 2/2015 | Partovi et al. | |
| 9,627,130 | B2 * | 4/2017 | Golko | H01F 7/0247 |
| 10,637,263 | B2 * | 4/2020 | Goldberg | H02J 50/10 |
| 10,688,674 | B2 * | 6/2020 | Schaefer | H01F 7/0242 |
| 10,873,204 | B2 * | 12/2020 | Graham | H02J 50/005 |
| 11,025,093 | B2 * | 6/2021 | Schaefer | B26B 19/3873 |
| 11,331,822 | B2 * | 5/2022 | Roman | H02J 50/005 |
| 11,342,792 | B2 * | 5/2022 | Partovi | H02J 50/10 |
| 11,476,708 | B2 * | 10/2022 | Schaefer | B26B 19/3873 |
| 2004/0189246 | A1 | 9/2004 | Bulai et al. | |
| 2005/0017677 | A1 | 1/2005 | Burton et al. | |
| 2009/0056141 | A1 * | 3/2009 | Barry | B26B 21/40 |
| | | | | 30/41.7 |
| 2012/0091951 | A1 | 4/2012 | Sohn | |
| 2012/0112553 | A1 * | 5/2012 | Stoner, Jr. | H02J 7/0047 |
| | | | | 307/104 |
| 2012/0256585 | A1 | 10/2012 | Partovi et al. | |
| 2013/0026983 | A1 | 1/2013 | Yamamoto et al. | |
| 2014/0266019 | A1 | 9/2014 | Pigott | |
| 2015/0246454 | A1 | 9/2015 | Mintz et al. | |
| 2018/0207821 | A1 * | 7/2018 | Schaefer | B26B 19/3873 |
| 2018/0212465 | A1 * | 7/2018 | Schaefer | A45D 27/29 |
| 2018/0212466 | A1 | 7/2018 | Schaefer et al. | |
| 2019/0006893 | A1 * | 1/2019 | Shaw | H02J 50/10 |
| 2022/0140650 | A1 * | 5/2022 | Santana | H02J 7/0042 |
| | | | | 320/108 |
| 2023/0079950 | A1 * | 3/2023 | Vanden Hoek | H01F 7/0252 |
| | | | | 307/104 |

FOREIGN PATENT DOCUMENTS

| | | | | |
|---|---|---|---|---|
| CN | 107696072 | | 2/2018 | |
| CN | 210169306 U | * | 3/2020 | |
| EP | 1810796 A1 | * | 7/2007 | B26B 19/06 |
| EP | 1878545 A2 | * | 1/2008 | B26B 19/3873 |
| EP | 3644475 | | 4/2020 | |
| JP | H1094685 A | * | 4/1998 | B26B 19/3813 |
| JP | 3814888 | | 8/2006 | |
| JP | 4092895 | | 5/2008 | |
| JP | 2014064375 | | 4/2014 | |
| JP | 2017511677 A | * | 4/2017 | H01F 38/14 |
| KR | 10-2020-0021403 | | 2/2020 | |
| TW | M414057 U | * | 10/2011 | H02J 50/10 |
| TW | M506023 | | 8/2015 | |
| WO | WO-9825736 A1 | * | 6/1998 | B26B 19/14 |
| WO | WO2009/031639 | | 3/2009 | |
| WO | WO2021/061647 | | 4/2021 | |

* cited by examiner

MAGNETIC POSITIONING FOR INDUCTIVELY CHARGING A HAND-HELD, HAIR CLIPPER ON A CHARGING PAD

CROSS-REFERENCE TO RELATED PATENT APPLICATIONS

The present application is a continuation of International Application No. PCT/US2022/077793, filed Oct. 7, 2022, which claims the benefit of and priority to U.S. Provisional Application No. 63/253,922 filed on Oct. 8, 2021, which are incorporated herein by reference in their entireties.

BACKGROUND OF THE INVENTION

The present invention relates to inductively charging a device such as a hand-held hair trimmer or clipper using a charging pad/platform and/or stand. In particular, the present invention relates to the inclusion of a permanent magnet in at least one, or both, of the device and the charging pad and/or stand to generate a magnetic force between the device and pad and/or stand to pull or bias the device such that the associated inductive charging coils of the device and charging pad and/or stand are brought into alignment by the magnetic force. This arrangement may provide all of the force necessary to adequately align the inductive charging coils of the device and charging pad and/or stand when the device is placed on the charging pad and/or stand, or generate a force sufficient to provide a tactile feedback to indicate to the user that the coils are aligned.

The batteries of many hand held devices are charged using inductive charging. In general this is accomplished using a pair of inductive charging coils, one located in the device and appropriately coupled to the device battery, and one located in the inductive charger. To initiate and sustain charging, the coils must be properly aligned and spaced. For some applications, the devices are physically shaped to mate with a charging cradle/holder. This arrangement provides alignment and spacing of the device and charger coils to provide inductive charging. One example of this arrangement is rechargeable tooth brushes. Another arrangement is to use a charging pad which includes an inductive coil which interacts with the inductive coil of the device to provide charging of the device battery(s). With this arrangement the user places the device on the pad to initiate and sustain charging. However, the use of a charging pad requires that the user adequately align the device with the pad to initiate and sustain charging. Failure to adequately align the device with the pad will result in the absence of charging due to the improper alignment and or spacing of the device and pad charging coils. Additionally, if the device is bumped out of alignment with the pad, charging will terminate. By way of example, most current model cellular phones can be charged on a charging pad. However, this requires that the user align the phone relative to the pad to initiate and sustain charging of the cell phone battery.

SUMMARY OF THE INVENTION

One embodiment of the invention relates to a system for a hand-held hair cutting device including a housing with a charging interface surface. The system includes a battery contained within the housing and coupled to a first inductive charging coil. The first inductive charging coil is located within the housing proximate to the charging interface surface. The battery is chargeable with a charging pad including a power supply coupled to a second inductive charging coil. The second inductive charging coil is located proximate to a support surface for supporting the hair cutting device. The charging pad is configured to charge the battery when the first and second charging coils are oriented in a predetermined alignment. A permanent magnet is fixed within one of the device or the pad and a field device is positioned within the other of the device and pad such that the permanent magnet and field device interact to force the coils toward the predetermined alignment. The system further includes a pair of blades supported by the housing and an electrically powered drive contained within the housing and coupled to the battery. At least one of the blades oscillates or moves relative to the other blade in response to electric power from the battery.

Another embodiment of the invention relates to a system for charging a device including a housing with a charging interface surface. The device includes a battery coupled to a first inductive charging coil. The first inductive charging coil is located proximate to the charging interface surface. The system further includes a charging pad with a power supply coupled to a second inductive charging coil. The second inductive charging coil located proximate to a support surface for supporting the device. The charging pad is configured to charge the battery when the first and second charging coils are oriented in a predetermined alignment. A permanent magnet is fixed within one of the device or the pad and a field device is positioned within the other of the device and pad such that the permanent magnet and field device interact to force the coils toward the predetermined alignment.

Another embodiment of the invention relates to a system for charging a hand0held hair cutting device including a housing with a charging interface surface. The system includes a battery contained within the housing and coupled to a first inductive charging coil. The first inductive charging coil is located within the housing proximate to the charging interface surface. The system further includes a charging pad with a power supply coupled to a second inductive charging coil. The second inductive charging coil located proximate to a support surface for supporting the device. The charging pad is configured to charge the battery when the first and second charging coils are oriented in a predetermined alignment. A permanent magnet is fixed within one of the device or the pad and a field device is positioned within the other of the device and pad such that the permanent magnet and field device interact to force the coils toward the predetermined alignment. The system further includes a pair of oscillating blades supported by the housing and an electrically powered drive contained within the housing and coupled to the battery. At least one of the blades oscillates relative to the other in response to electric power from the battery.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a system for charging a hand-held, hair cutting device are shown. In general, the system for a hand-held hair cutting device is configured to align the hair cutting device for inductive charging. In contrast to the system discussed herein, other systems using inductive charging require precise alignment while placing the device to be charged and sustaining that placement during charging in order to successfully charge the device. Applicant believes the charging system described allows users for a greater variety of charging placements of the hair cutting device and the ability to leave the hair cutting device without worry that the charging will not be sustained.

Figure 1:
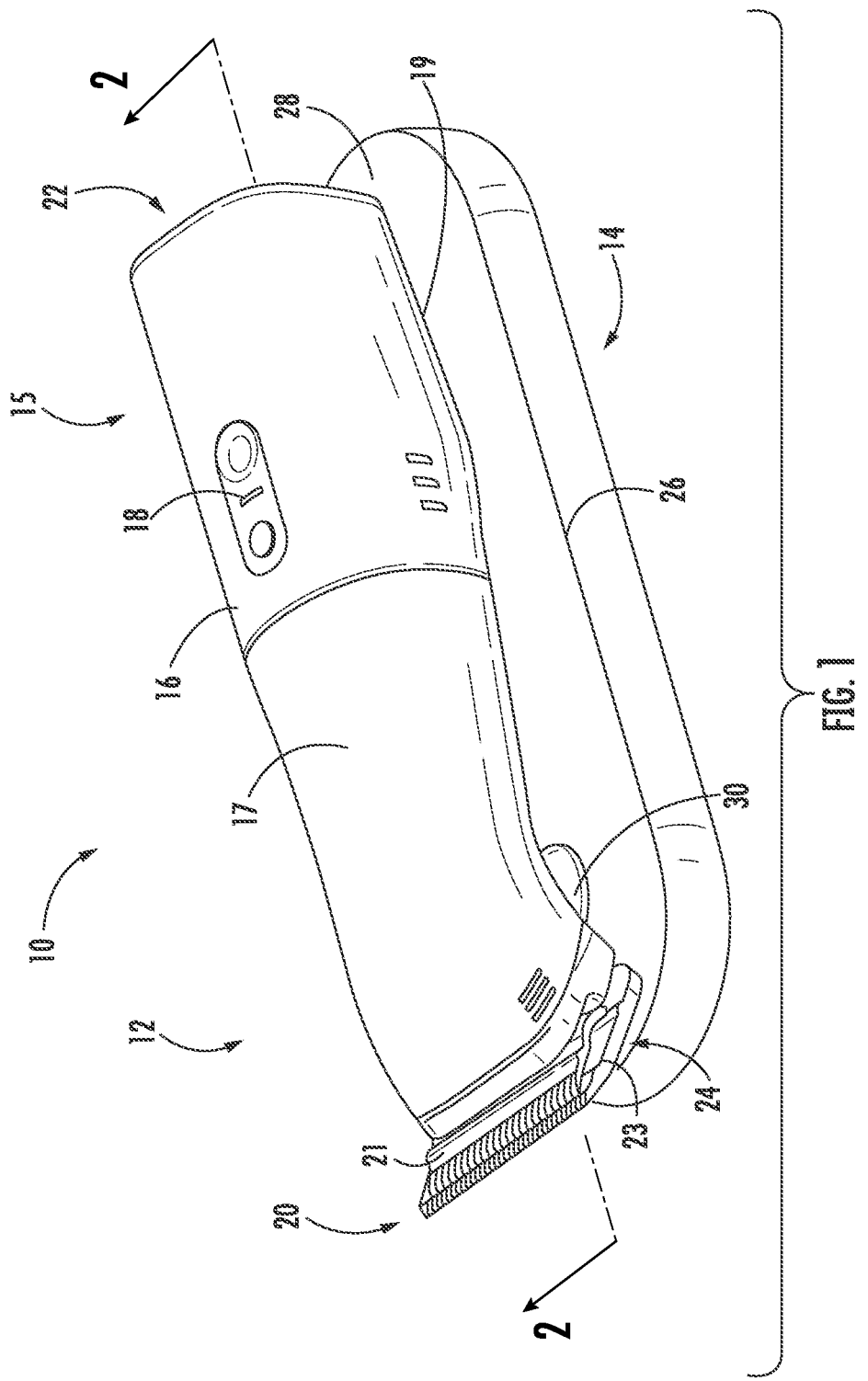
FIG. 1 is a perspective view of a clipper on a charging pad in a first, unaligned position, according to an exemplary embodiment.

Referring to FIG. 1, various aspects of a charging system for a hair cutting device, shown as a charging system for a hand-held hair cutting device 10 are shown. The system 10 includes a hair trimmer, clipper, or shaver 12 and a charging station shown as a charging pad or mat 14. In a specific embodiment the charging station may be a stand or holder for the hair cutting device.

Hair trimmer 12 includes a handle 15 and a blade assembly 24. In general, blade assembly 24 includes various components for cutting hair (e.g., an oscillating upper blade 21 and a stationary lower blade 23). FIG. 1 shows a handle 15 with a housing 16 that includes an upper housing 17 and a lower housing 19. Upper housing 17 includes a power button 18. In various embodiments, handle 15 is a single, continuous, and/or integral part, such that upper housing 17 and lower housing 19 are permanently joined and/or fabricated as an integral continuous component or unitary part. In other embodiments, upper housing 17 is fabricated separately from lower housing 19 and joined or coupled to form handle 15 (e.g., coupled using fasteners). In a specific embodiment, lower housing 19 includes a non-planar outer surface. Handle 15 has a first end or cutting end 20. Blade assembly 24 is positioned at cutting end 20. Handle 15 further includes a second end or gripping end 22. Gripping end 22 is located longitudinally opposite cutting end 20.

Charging pad or mat 14 includes a pad housing 26. Pad housing 26 includes a top surface 28. Top surface 28 acts as a support surface for trimmer 12 and is positioned against lower housing 19 of trimmer 12 which has an outer surface that acts as an interface with charging pad 14 during charging. Top surface 28 of pad housing 26 includes an alignment or connection portion 30. In a specific embodiment, top surface 28 of charging pad 14 is a non-planar surface.

Figure 2:
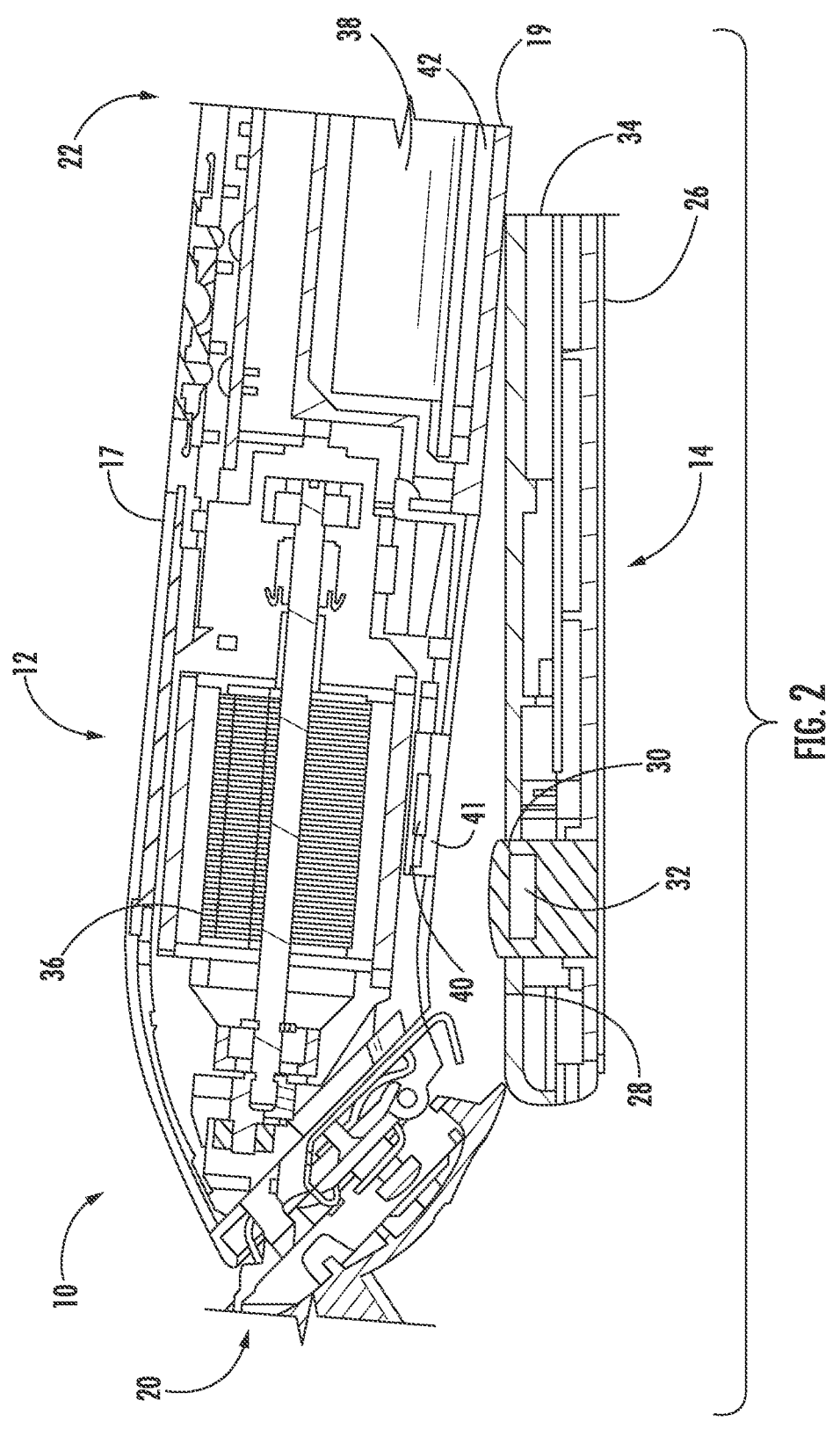
FIG. 2 is a cross-section view of the clipper on a charging pad of FIG. 1 in a first, unaligned position, according to an exemplary embodiment.

Referring to FIG. 2, a cross section view of the charging system for a hand-held hair cutting device 10 is shown. Trimmer 12 includes a powered drive 36 positioned within housing 16 adjacent to cutting end 20 and a battery 38 positioned between powered drive 36 and gripping end 22. As shown in FIGS. 1 and 2, power button 18 within upper housing 17 electronically couples battery 38 to a control board and selectively controls powered drive 36 (e.g., controls speed and/or powers drive 36 on and off). At least one of the blades 21, 23 oscillates relative to the other in response to electric power from the battery. Battery 38 is chargeable using charging pad 14. In a specific embodiment, battery 38 is electronically coupled to an electric charging port that extends through handle 15.

Trimmer 12 further includes a field device, shown as magnet 40 positioned within a magnet housing 41. In another embodiment, the field device may be an inductive charging coil. In a specific embodiment, the field device may be a ferromagnetic material. In a specific embodiment, magnet 40 is a permanent magnet (e.g., rare earth magnet, Alnico magnet, ceramic magnet). A first inductive coil 42 is positioned within trimmer 12 along lower housing 19, between battery 38 and lower housing 19. Magnet 40 is positioned along lower housing 19 with at least a portion of magnet housing 41 forming an outer surface of trimmer 12 together with lower housing 19.

Alignment or connection portion 30 extends from top surface 28 of charging pad 14 into space within pad housing 26. Connection portion 30 surrounds a field device shown as charging pad magnet 32. Charging pad 14 further includes a second inductive coil 34 and a power supply. Second inductive coil 34 is positioned at an end of charging pad 14 opposing charging pad magnet 32. Charging pad 14 is configured to charge the battery 38 when the first 42 and second inductive charging coils 34 are oriented in a predetermined alignment. In a specific embodiment, a permanent magnet is fixed within one of the device or the pad and a field device is positioned within the other of the device and pad such that the permanent magnet and field device interact to force the coils toward the predetermined alignment. In a specific embodiment, the field device may be a ferromagnetic material. In another embodiment, the field device may be an inductive charging coil. In a specific embodiment, magnet 32 is a permanent magnet (e.g., rare earth magnet, Alnico magnet, ceramic magnet).

Figure 3:
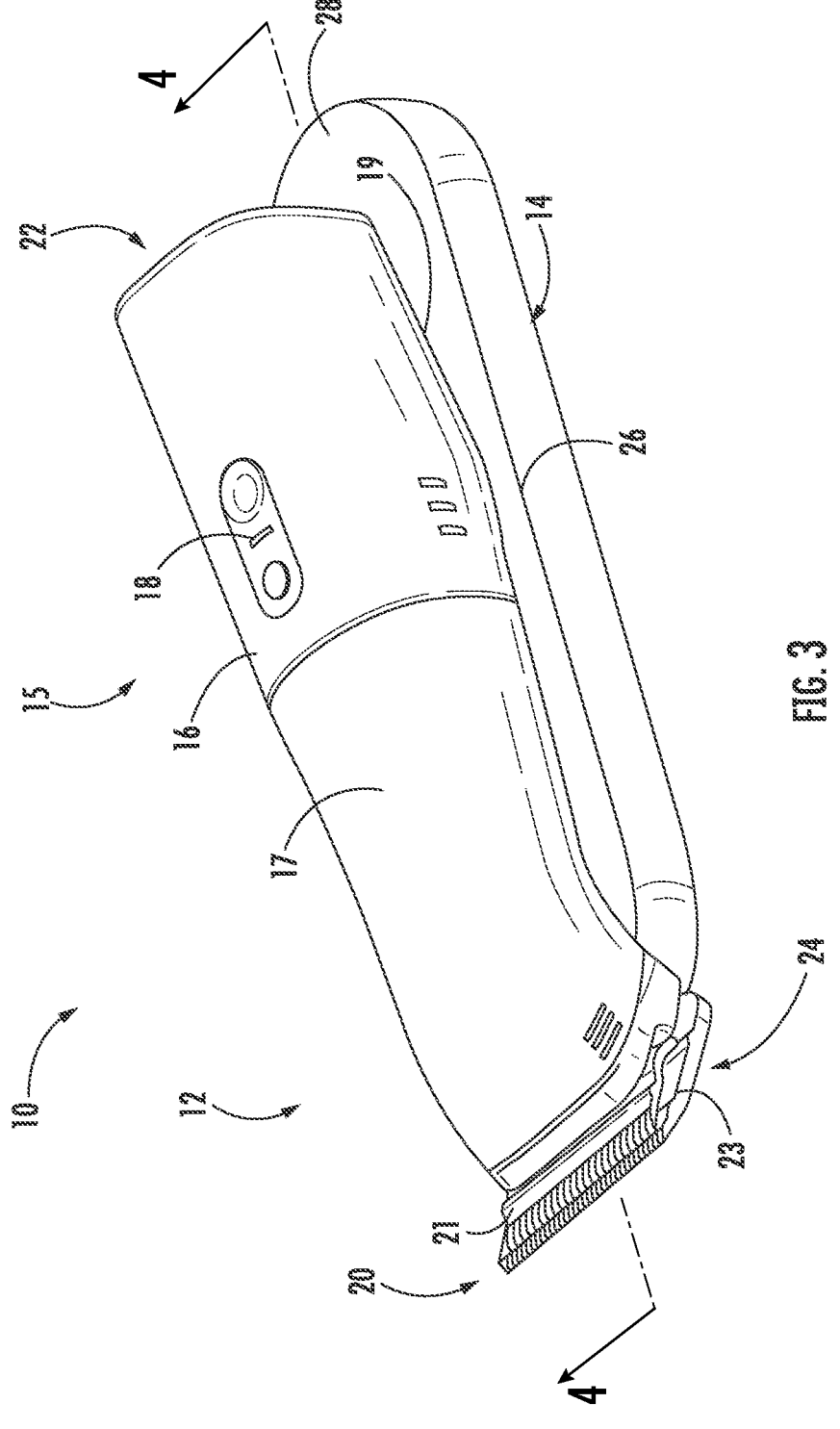
FIG. 3 is a perspective view of the clipper on the charging pad of FIG. 1 in a second, aligned position, according to an exemplary embodiment.
Figure 4:
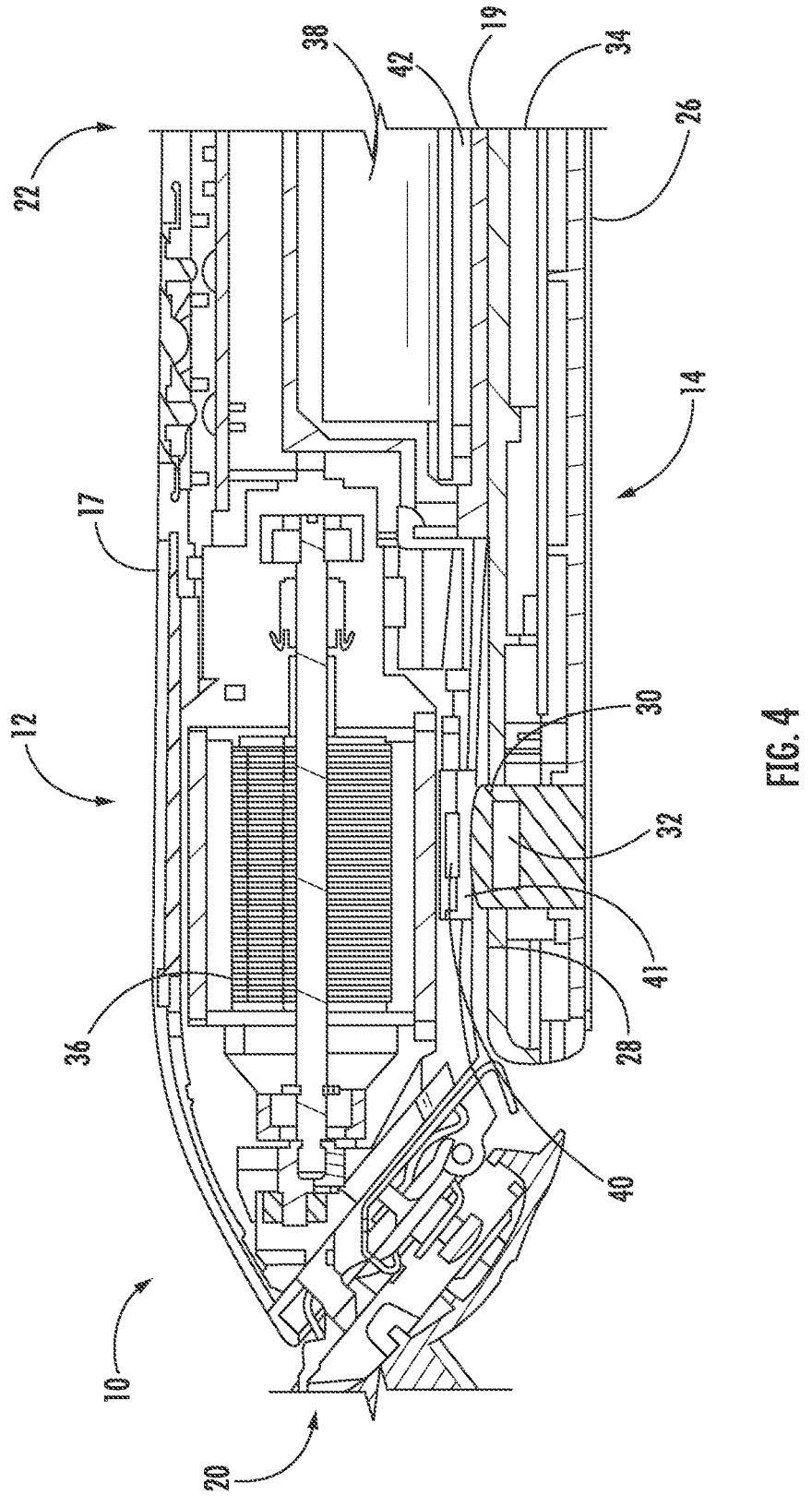
FIG. 4 is a cross-section view of the clipper on a charging pad of FIG. 1 in a second, aligned position, according to an exemplary embodiment.

Referring to FIGS. 3 and 4, the charging system for a hand-held hair cutting device 10 positioned in an aligned position are shown. The alignment movement shown from FIGS. 1-2 to FIGS. 3-4 demonstrates the action of magnets and/or the field device to pull the trimmer 12 into a position on charging pad 14 that allows for alignment between first inductive coil 42 and second inductive coil 34 such that trimmer 12 is able to be charged.

Figure 5:
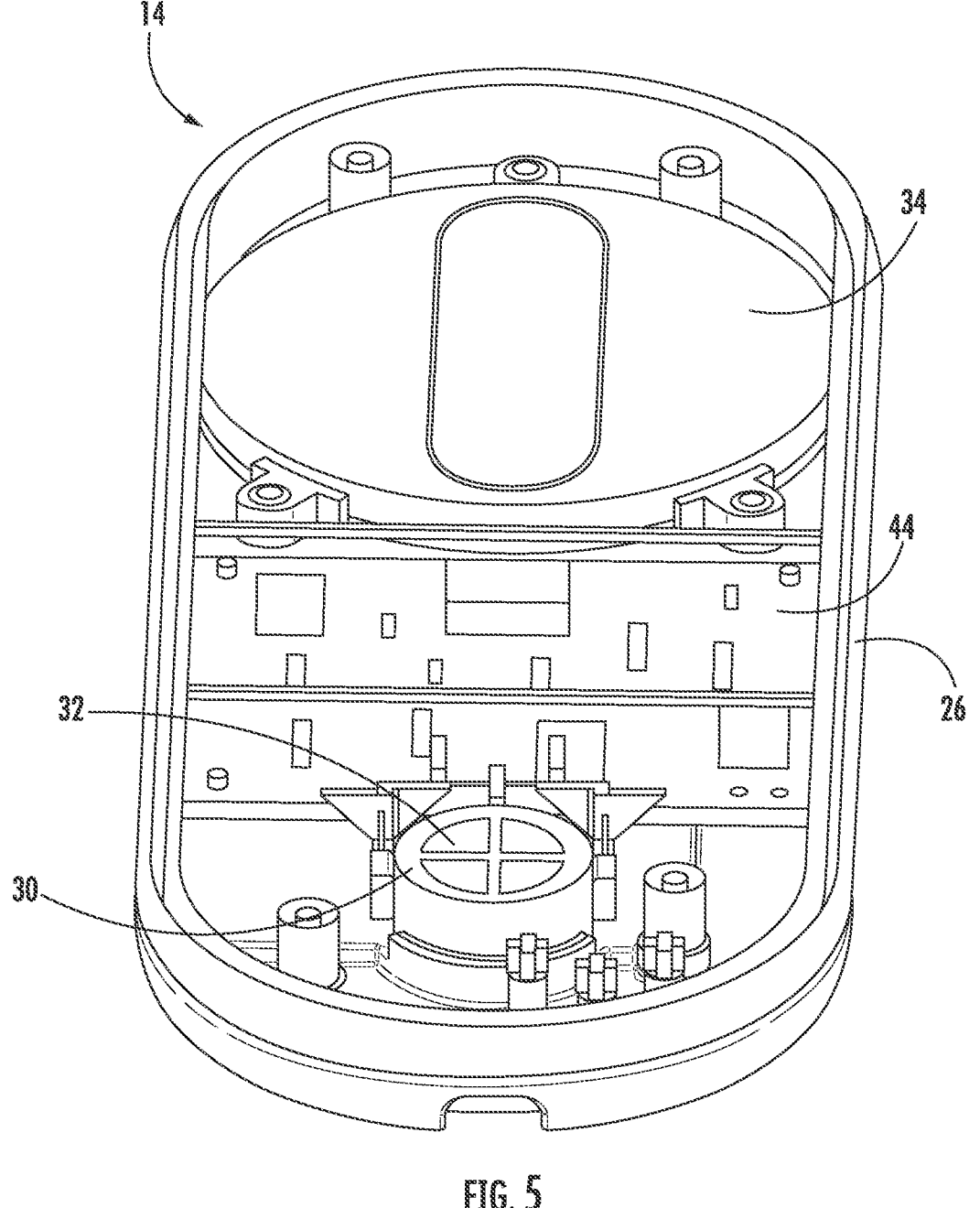
FIG. 5 is an overhead perspective of the charging pad, according to an exemplary embodiment.

Referring to FIG. 5, an overhead perspective view of charging pad 14 is shown. Magnet 32 is surrounded by connection portion 30 of charging pad 14 which acts as an interface with lower housing 19 and specifically magnet housing 41 of trimmer 12. A control board 44 is positioned within charging pad 14 between connection portion 30 and the second inductive coil 34.

Figure 6:
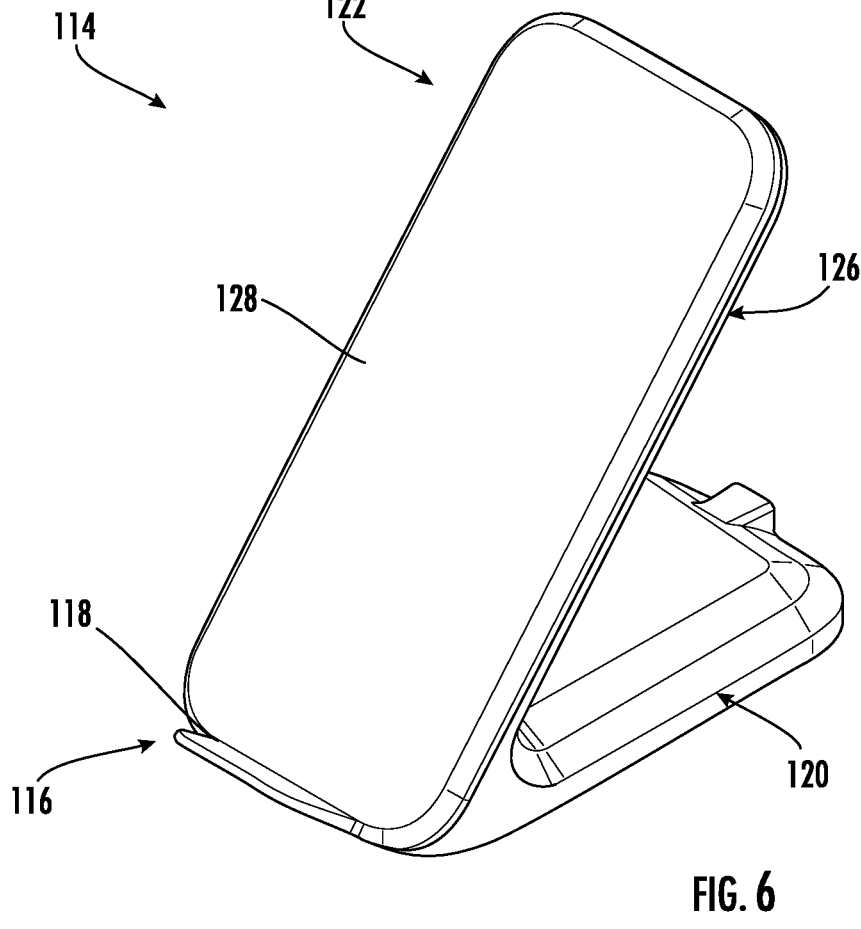
FIG. 6 is a perspective view of a charging stand, according to an exemplary embodiment.
Figure 7:
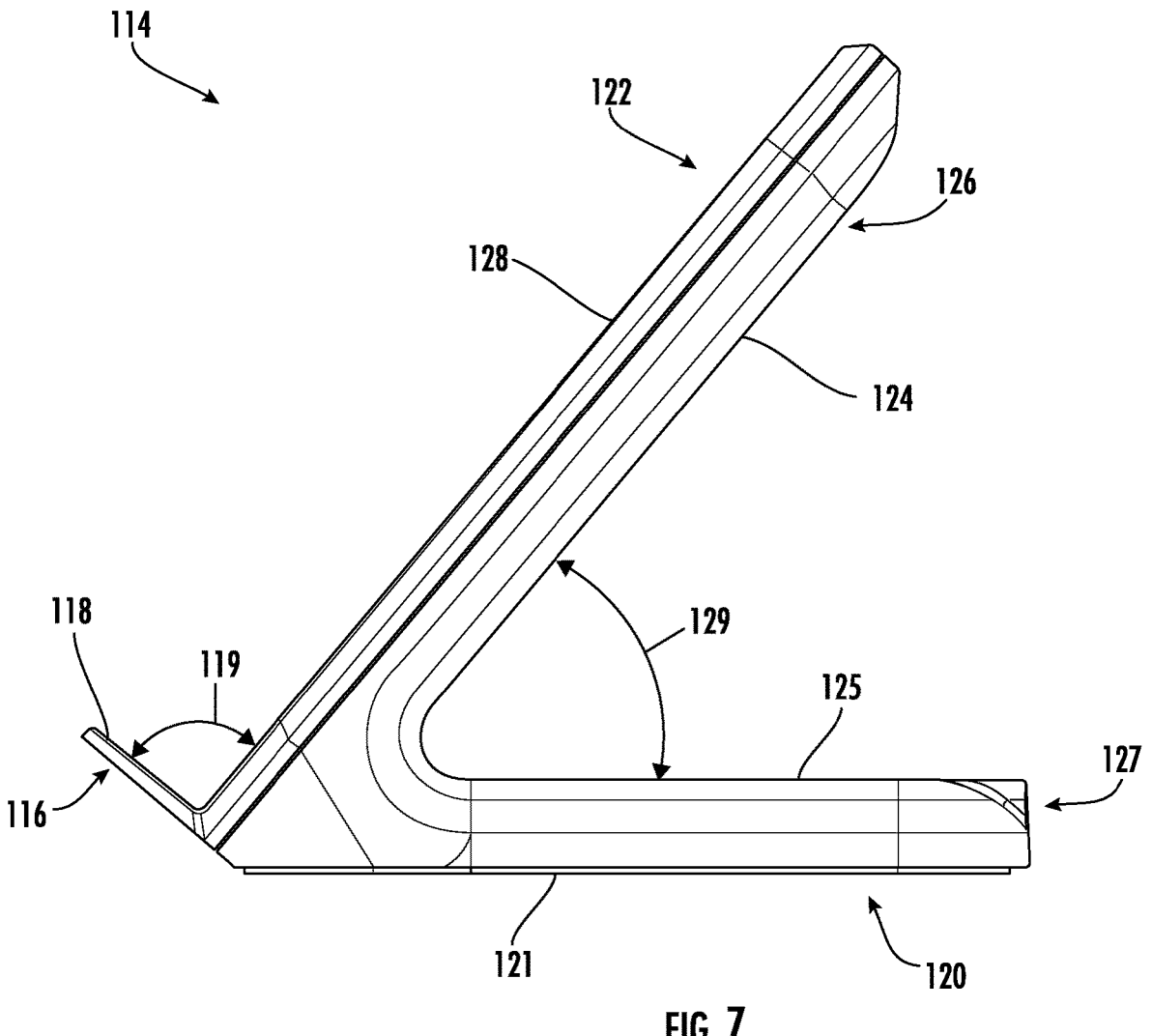
FIG. 7 is a side view of the charging stand of FIG. 6, according to an exemplary embodiment.
Figure 8:
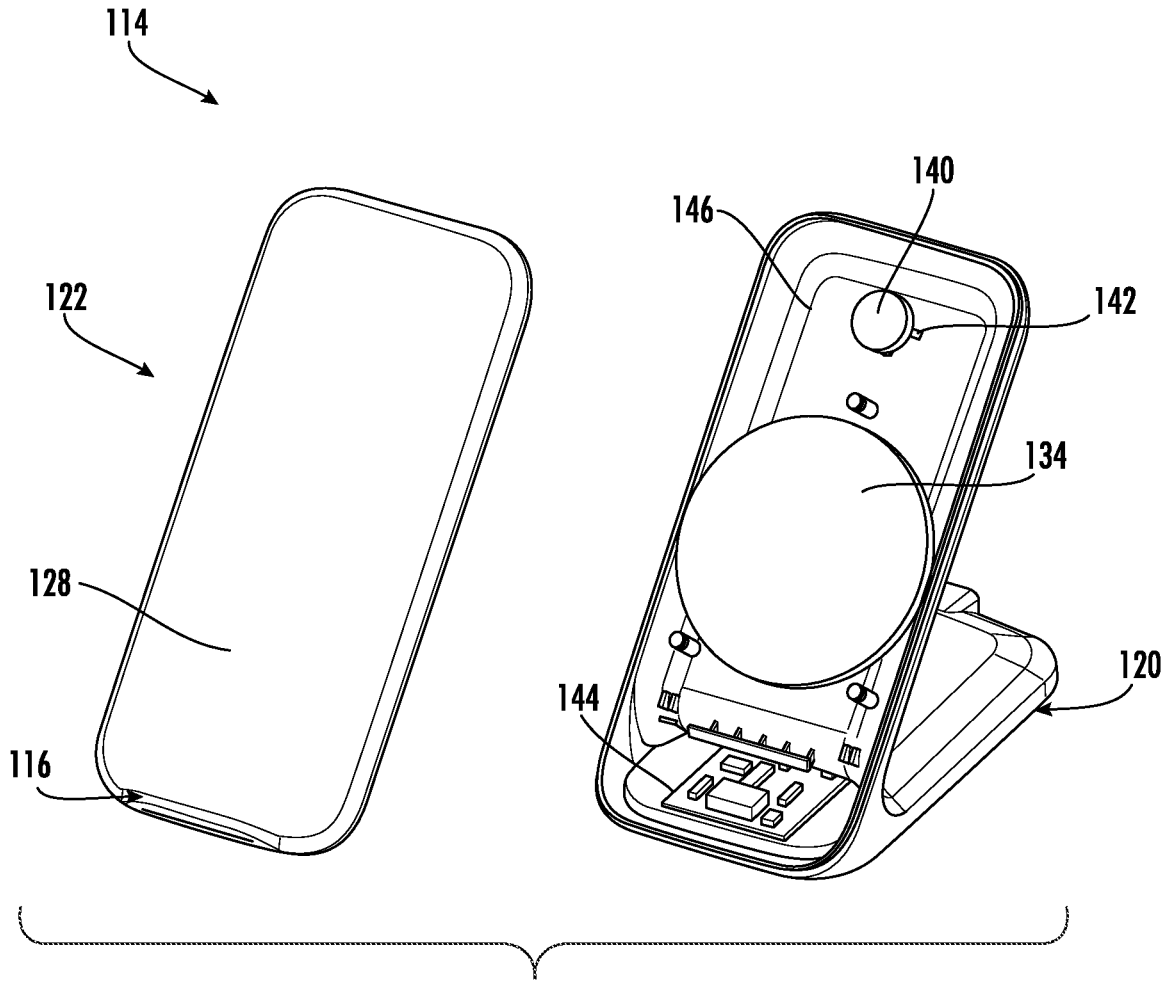
FIG. 8 is a partially exploded view of the charging stand of FIG. 6, according to an exemplary embodiment.

Referring to FIGS. 6-8, various aspects of a charging stand or holder that can be utilized with a system for a hair cutting device, shown as a charging stand 114 are shown. In contrast to a charging pad, Applicant believes a charging stand provides improved ease of use (i.e., easier to reach and grab hair cutting device for use in a barber shop) and space savings (angled and/or vertical stand takes up less space). The charging stand 114 can be used with a hair cutting device such as a hair trimmer, clipper, or shaver. Charging stand 114 includes a stand housing 126. Stand housing 126 includes a base 120 and an upper portion 122. Upper portion 122 of stand housing 126 extends upward or away from base 120 at an angle.

Stand housing 126 includes a top surface 128 shown as a charging surface. Top surface 128 couples and/or connects to upper portion 122 of stand housing 126. Top surface 128 at least partially acts as a support surface for a hair cutting device and is positioned against a lower housing of a hair cutting device (see e.g., 19 in FIG. 1) which has an outer surface that acts as an interface with charging stand 114 during charging. In a specific embodiment, top surface 128 of charging stand 114 is a planar surface. In another specific embodiment, top surface 128 of charging stand 114 is a non-planar surface. In a specific embodiment, lower housing surface 156 or the charging interface surface is non-planar and top surface 128 of charging stand 114 or the support surface is planar.

Stand housing 126 and specifically upper portion 122 includes a projected portion or arm 116. Arm 116 extends away from upper portion 122 and/or base 120 of stand housing 126 at an angle. Arm 116 includes a support surface 118 configured to support at least a portion of a hair cutting device on charging stand 114. In a specific embodiment, support surface 118 engages and/or is positioned against a bottom or end surface of a hair cutting device (see e.g., FIG. 9).

Referring to FIG. 7, a side view of charging stand 114 is shown, according to an exemplary embodiment. A support angle 119 is defined between support surface 118 and top surface 128 of stand housing 126. Support angle 119 is between 70 degrees and 110 degrees, specifically between 80 degrees and 100 degrees, and more specifically between 85 degrees and 95 degrees. In such an embodiment, support angle 119 is about 88 degrees (i.e., 88 degrees plus or minus 5 degrees). In a specific embodiment, arm 116 extends away from upper portion 122 at a generally perpendicular angle such that support angle 119 is about 90 degrees (i.e., 90 degrees plus or minus 10 degrees).

Upper portion 122 of stand housing 126 further includes a rear surface 124. Rear surface 124 is positioned above and/or extends over base 120 of charging stand 114. Base 120 includes an upward facing surface 125. A stand angle 129 is defined between rear surface 124 and upward facing surface 125. Stand angle 129 is between 30 degrees and 70 degrees, specifically between 40 degrees and 60 degrees, and more specifically between 45 degrees and 55 degrees. In such an embodiment, stand angle 129 is about 50 degrees (i.e., 50 degrees plus or minus 5 degrees). Base 120 further includes an electric charging port 127 for charging stand 114.

Referring to FIG. 8, a partially exploded view of charging stand 114 is shown, according to an exemplary embodiment. Charging stand 114 further includes an inductive coil 134 and a power supply electronically coupled to charging port 127. A control board 144 is positioned within charging stand 114 between charging port 127 and inductive coil 134. Control board 144 is located in base 120 of stand housing 126. The power supply of charging stand 114 is coupled to inductive coil 134.

Inductive coil 134 is positioned within stand housing 126 and/or upper portion 122 along with a charging stand magnet 140. In a specific embodiment, inductive coil 134 is positioned along and/or generally parallel to an inner surface 146 of upper portion 122. In other words, inductive coil 134 is located proximate to top surface 128 which is a support surface for a device (i.e., hair cutting device). In such an embodiment, inductive coil 134 is positioned at an angle of about 50 degrees (i.e., 50 degrees plus or minus 5 degrees) relative to upward facing surface 125 of base 120. Inner surface 146 opposes rear surface 124 and is positioned at stand angle 129 relative to base 120. Magnet 140 is held and/or supported by a holder 142. Holder 142 is positioned on and/or coupled to inner surface 146 of upper portion 122.

Charging stand 114 is configured to charge a battery of a hair clipping device when the inductive coil of the hair clipping device and inductive charging coil 134 are oriented in a predetermined alignment. In a specific embodiment, a permanent magnet is fixed within one of the device or the stand and a field device is positioned within the other of the device and stand such that the permanent magnet and field device interact to force the coils toward the predetermined alignment. In a specific embodiment, the field device may be a ferromagnetic material. In another embodiment, the field device may be an inductive charging coil. In a specific embodiment, magnet 140 is a permanent magnet (e.g., rare earth magnet, Alnico magnet, ceramic magnet). In another specific embodiment, the field device is a ferromagnetic material which is magnetically attracted to a permanent magnet.

Figure 9:
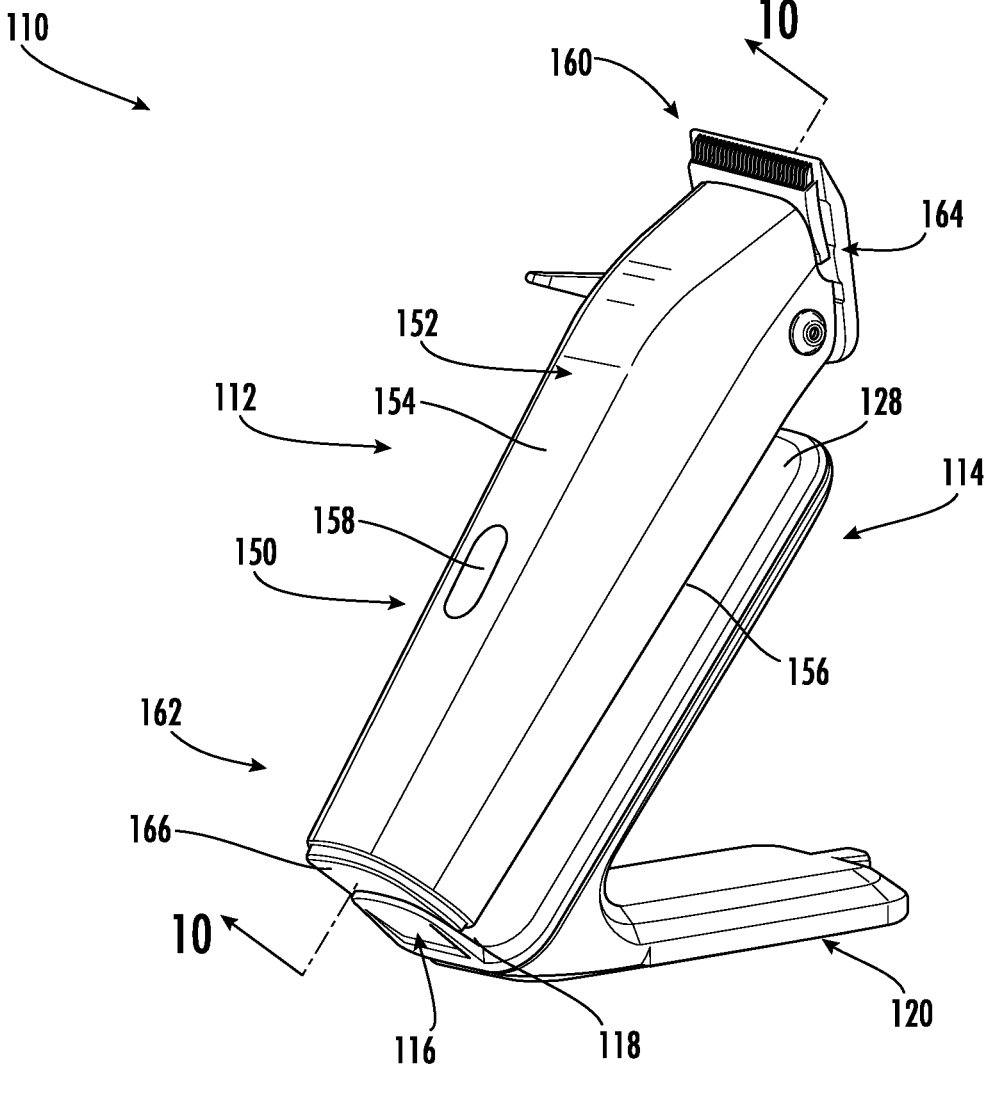
FIG. 9 is a perspective view of a clipper on the charging stand, according to an exemplary embodiment.

Referring to FIG. 9, various aspects of a charging system for a hair cutting device, shown as a charging system for a hand-held hair cutting device 110 are shown. The system 110 includes a hair clipper 112 and charging station shown as charging stand 114. In a specific embodiment the charging station may be a mat or pad for the hair cutting device.

Hair clipper 112 includes a handle 150 and a blade assembly 164. In general, blade assembly 164 includes various components for cutting hair (e.g., an oscillating upper blade and a stationary lower blade). The pair of blades of blade assembly 164 supported by a housing 152. FIG. 9 shows a handle 150 with the housing 152 that includes an upper housing surface 154 and a lower housing surface 156. Upper housing surface 154 includes a power button 158. In various embodiments, handle 150 is a single, continuous, and/or integral part. In other embodiments, an upper housing is fabricated separately from lower housing and joined or coupled to form handle 150 (e.g., coupled using fasteners). In a specific embodiment, lower housing surface 156 is a non-planar surface. Handle 150 has a first end or cutting end 160. Blade assembly 164 is positioned at cutting end 160. Handle 150 further includes a second end or gripping end 162. Gripping end 162 is located longitudinally opposite cutting end 160.

Gripping end 162 includes a bottom or end surface 166. As previously discussed, bottom surface 166 engages and/or is positioned against a support surface 118 of arm 116 of charging stand 114 as hair clipper 112 is being charged.

Figure 10:
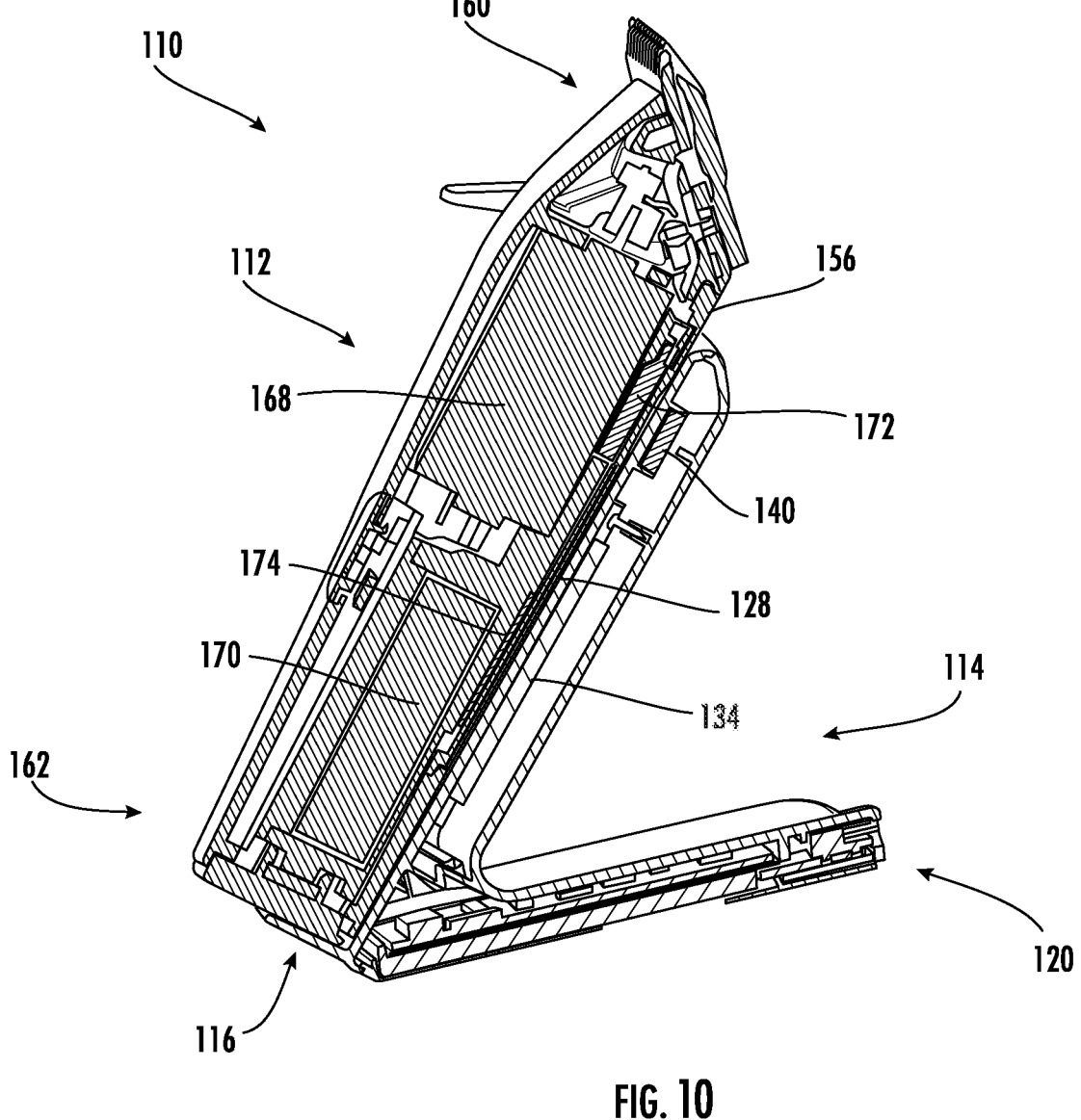
FIG. 10 is a cross-section view of the clipper on the charging stand of FIG. 9, according to an exemplary embodiment.

Referring to FIG. 10, a cross section view of the charging system for a hand-held hair cutting device 110 is shown. Hair clipper 112 includes a motor and/or power drive 168 positioned within housing 152 adjacent to cutting end 160. A battery 170 is contained within housing 152 and is positioned between power drive 168 and gripping end 162. Power button 158 electronically couples battery 170 to a control board and selectively controls powered drive 168 (e.g., controls speed and/or powers drive 168 on and off). In a specific embodiment, power drive 168 is an electrically powered drive. Powered drive 168 is coupled to the battery 170 such that at least one of the pair of blades is moved. At least one of the pair of blades of blade assembly 164 oscillates or moves relative to the other blade in response to electric power from the battery. Battery 170 is chargeable using charging stand 114. In a specific embodiment, battery 170 is electronically coupled to an electric charging port that extends through handle 150. Battery 170 is chargeable using a charging device such as charging stand 114.

Hair clipper 112 further includes a field device, shown as magnet 172 positioned within housing 152. In a specific embodiment, the field device is a magnet. In another embodiment, the field device may be an inductive charging coil. In a specific embodiment, the field device may be a ferromagnetic material. In a specific embodiment, magnet 172 is a permanent magnet (e.g., rare earth magnet, Alnico magnet, ceramic magnet). In a specific embodiment, the magnet is a rare earth magnet. An inductive coil 174 is coupled to battery 170 and positioned within hair clipper 112 between battery 170 and lower housing surface 156. Inductive coil 174 is located within housing 152 proximate to the lower housing surface 156 (i.e., the charging interface surface). Magnet 172 is positioned in a lower portion of housing 152 adjacent to lower housing surface 156. In other words, charging stand 114 is configured to charge battery 170 when inductive coil 174 and inductive coil 134 are oriented in a predetermined alignment (i.e., a charging alignment).

When a user places hair clipper 112 on charging stand 114, field device and/or magnet 172 pulls and/or moves hair clipper 112 into a position on charging stand 114 that allows for alignment between inductive coil 174 of hair clipper 112 and inductive coil 134 of charging stand 114. In other words when a magnet, such as magnet 140 is fixed and/or positioned within one of the hair clipper 112 or charging stand 114 and a field device such as magnet 172 is positioned within the other of the hair clipper 112 and charging stand 114, the magnet 140 and field device (i.e., magnet 172) interact to force the coils (i.e., 134 and 174) toward the predetermined charging alignment. The alignment between inductive coil 174 of hair clipper 112 and inductive coil 134 of charging stand 114 allows for the charging of hair clipper 112. In the aligned position, lower housing surface 156 rests against and/or engages top surface 128 of charging stand 114 as the cutting end 160 and/or blade assembly 164 extends beyond upper portion 122 of charging stand 114. In other words, a portion of hair clipper 212 and/or lower housing surface 156 that acts as a charging interface surface is positioned above the uppermost portion of charging stand 114 such that clippers or trimmers of various lengths can be charged on charging stand 114.

In a specific embodiment, the magnets 140, 172 are arranged to generate an attractive force there between to force the coils 134, 172 toward the predetermined alignment. In another specific embodiment, one of the magnet 140 and field devices (i.e., magnet 172) includes a plurality of rare earth magnets arranged to generate repulsive forces there between which force the coils 134, 172 toward the predetermined alignment. In a specific embodiment, the field device is the inductive charging coil 134, 174 fixed within the hair cutting device or charging stand 114 which contains the field device.

Figure 11:
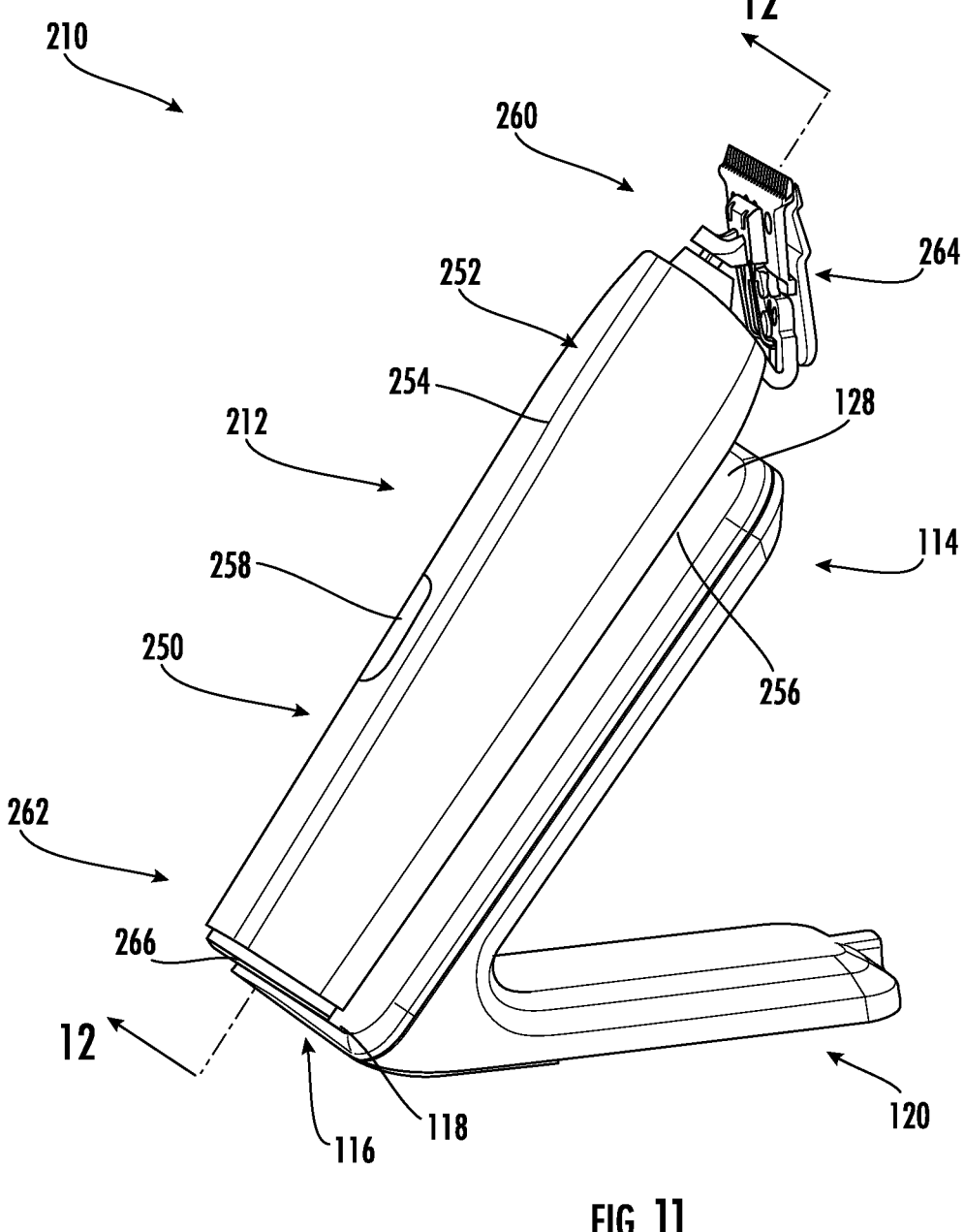
FIG. 11 is a perspective view of a trimmer on the charging stand, according to an exemplary embodiment.
Figure 12:
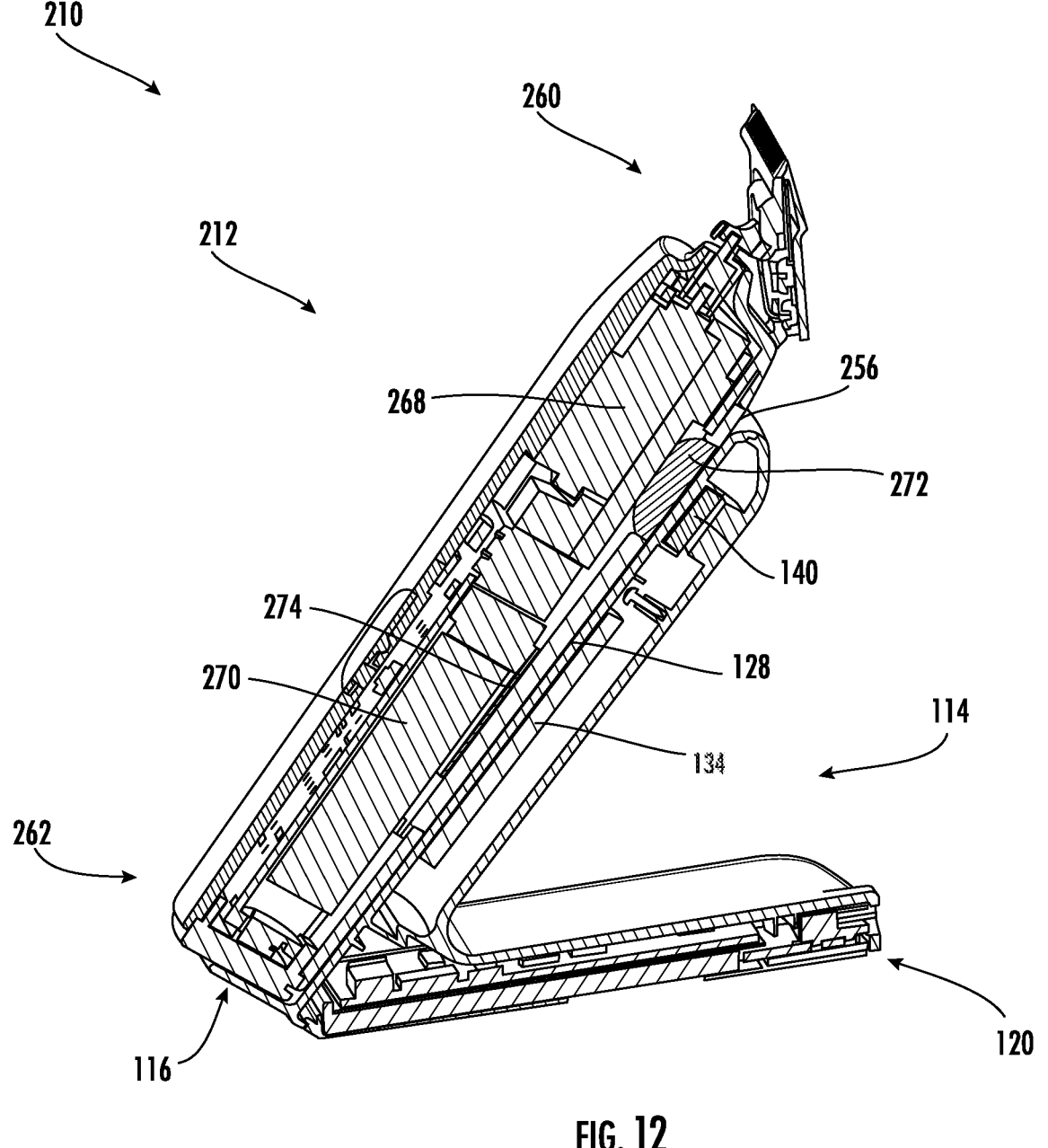
FIG. 12 is a cross-section view of the clipper on the charging stand of FIG. 11, according to an exemplary embodiment.

Referring to FIGS. 11-12, various aspects of a charging system for a hair cutting device, shown as a charging system for a hand-held hair cutting device 210 are shown. The system 210 includes a hair trimmer 212 and charging station shown as charging stand 114. Charging system 210 is the same as charging system 110 and/or 10 except for the differences discussed herein. In a specific embodiment the charging station may be a mat or pad for the hair cutting device.

Hair trimmer 212 includes a handle 250 and a blade assembly 264. In general, blade assembly 264 includes various components for cutting hair (e.g., an oscillating upper blade and a stationary lower blade). FIG. 11 shows a handle 250 with a housing 252 that includes an upper housing surface 254 and a lower housing surface 256. Upper housing surface 254 includes a power button 258. In various embodiments, handle 250 is a single, continuous, and/or integral part. In other embodiments, an upper housing is fabricated separately from lower housing and joined or coupled to form handle 250 (e.g., coupled using fasteners). In a specific embodiment, lower housing surface 256 is a non-planar surface. Handle 250 has a first end or cutting end 260. Blade assembly 264 is positioned at cutting end 260. Handle 250 further includes a second end or gripping end 262. Gripping end 262 is located longitudinally opposite cutting end 260.

Gripping end 262 includes a bottom or end surface 266. As previously discussed, bottom surface 266 engages and/or is positioned against a support surface 118 of arm 116 of charging stand 114 as hair trimmer 212 is being charged.

Referring to FIG. 12, a cross section view of the charging system for a hand-held hair cutting device 210 is shown. Hair trimmer 212 includes a motor and/or power drive 268 positioned within housing 252 adjacent to cutting end 260 and a battery 270 is positioned between power drive 268 and gripping end 262. Power button 258 electronically couples battery 270 to a control board and selectively controls powered drive 268 (e.g., controls speed and/or powers drive 268 on and off). At least one of the blades of blade assembly 264 oscillates relative to the other in response to electric power from the battery. Battery 270 is chargeable using charging stand 114. In a specific embodiment, battery 270 is electronically coupled to an electric charging port that extends through handle 250.

Hair trimmer 212 further includes a field device, shown as magnet 272 positioned within housing 252. In another embodiment, the field device may be an inductive charging coil. In a specific embodiment, the field device may be a ferromagnetic material. In a specific embodiment, magnet 272 is a permanent magnet (e.g., rare earth magnet, Alnico magnet, ceramic magnet). An inductive coil 274 is positioned within hair trimmer 212 between battery 270 and lower housing surface 256. Magnet 272 is positioned in a lower portion of housing 252 adjacent to lower housing surface 156.

When a user places hair trimmer 212 on charging stand 114, field device and/or magnet 272 pulls and/or moves hair clipper 212 into a position on charging stand 114 that allows for alignment between inductive coil 274 of hair trimmer 212 and inductive coil 134 of charging stand 114. The alignment between inductive coil 274 of hair trimmer 212 and inductive coil 134 of charging stand 114 allows for the charging of hair trimmer 212. In the aligned position, lower housing surface 256 rests against and/or engages top surface 128 of charging stand 114 as the cutting end 260 and/or blade assembly 264 extends beyond upper portion 122 of charging stand 114. In other words, a portion of hair trimmer 212 and/or lower housing surface 256 is positioned above the uppermost portion of charging stand 114 such that clippers or trimmers of various lengths can be charged on charging stand 114.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A system for a hand-held, hair cutting device comprising:
   a housing including:
   an upper housing; and
   a lower housing comprising a charging interface surface extending along a longitudinal axis of the housing;
   a battery contained within the housing and coupled to a first inductive charging coil, the first inductive charging coil being located within the housing proximate to the charging interface surface, the battery being chargeable with a charging stand including a power supply coupled to a second inductive charging coil, the second inductive charging coil being located proximate to a support surface for supporting the device, the charging stand being configured to charge the battery when the first and second charging coils are oriented in a predetermined alignment, wherein a permanent magnet is fixed within one of the device or stand and a field device is positioned within the other of the device and stand, such that the permanent magnet and the field device interact to force the coils toward the predetermined alignment;
   a pair of blades supported by the housing; and
   an electrically powered drive contained within the housing and coupled to the battery such that at least one of the pair of blades moves relative to the other blade in response to electric power from the battery;
   wherein one of the permanent magnet and the field device is positioned between the electrically powered drive and the charging interface surface.

2. The system of claim 1, wherein the field device is a magnet.

3. The system of claim 2, wherein the permanent magnet and the field device are rare earth magnets.

4. The system of claim 2, wherein the permanent magnet and field device are arranged to generate an attractive force there between to force the coils toward the predetermined alignment.

5. The system of claim 4, wherein one of the permanent magnet and field devices includes a plurality of rare earth magnets arranged to generate repulsive forces there between which force the coils toward the predetermined alignment.

6. The system of claim 4, wherein the charging interface surface is non-planar and the support surface is planar.

7. The system of claim 1, wherein the field device is a ferromagnetic material which is magnetically attracted to the permanent magnet.

8. The system of claim 1, wherein the support surface is a non-planar surface.

9. A system for charging a device comprising:
   a housing including a charging interface surface extending along a longitudinal axis of the housing;
   the device including:
   a battery coupled to a first inductive charging coil, the first inductive charging coil being located proximate to the charging interface surface; and
   a motor coupled to the battery;
   a charging stand including a power supply coupled to a second inductive charging coil, the second inductive charging coil being located proximate to a support surface for supporting the device, the charging stand being configured to charge the battery when the first and second charging coils are oriented in a predetermined alignment; and
   a permanent magnet fixed within one of the device or stand and a field device positioned within the other of the device and stand, wherein the permanent magnet and the field device interact to force the coils toward the predetermined alignment;
   wherein one of the permanent magnet or the field device is positioned between the motor and the charging stand; and
   wherein the first inductive charging coil is positioned between the battery and the charging interface surface.

10. The system of claim 9, wherein the field device is a magnet.

11. The system of claim 10, wherein the permanent magnet and field device are rare earth magnets.

12. The system of claim 10, wherein the permanent magnet and field device are arranged to generate an attractive force there between to force the coils toward the predetermined alignment.

13. The system of claim 12, wherein one of the permanent magnet and field devices includes a plurality of rare earth magnets arranged to generate repulsive forces there between which force the coils toward the predetermined alignment.

14. The system of claim 9, wherein the device is a hair trimmer.

15. The system of claim 14, wherein the field device is a permanent magnet.

16. The system of claim 15, wherein the permanent magnet and field device are rare earth magnets.

17. The system of claim 9, wherein the field device is a ferromagnetic material which is magnetically attracted to the permanent magnet.

18. The system of claim 9, wherein the field device is the first inductive charging coil or the second inductive charging coil fixed within the device or stand which contains the field device.

19. A system for charging a hand-held, hair cutting device comprising:

a housing including:

an upper housing; and a lower housing comprising a charging interface surface extending along a longitudinal axis of the housing;

a battery contained within the housing and coupled to a first inductive charging coil, the first inductive charging coil being located within the housing proximate to the charging interface surface;

a charging stand including a power supply coupled to a second inductive charging coil, the second inductive charging coil being located proximate to a support surface for supporting the device, the charging stand being configured to charge the battery when the first and second charging coils are oriented in a predetermined alignment;

a permanent magnet fixed within one of the device or stand and a field device positioned within the other of the device and stand, such that the permanent magnet and the field device interact to force the coils toward the predetermined alignment;

a pair of blades supported by the housing; and an electrically powered drive contained within the housing and coupled to the battery and at least one of the blades to oscillate one of the pair of blades relative to the other blade in response to electric power from the battery;

wherein the first inductive charging coil is positioned between the battery and the charging interface surface.

20. The system of claim 19, wherein the field device is a magnet.

21. The system of claim 20, wherein the permanent magnet and field device are rare earth magnets.

* * * * *